United States Patent
Tezuka et al.

(10) Patent No.: US 7,308,533 B2
(45) Date of Patent: Dec. 11, 2007

(54) METHOD FOR REORGANIZING ADDITIONAL WRITING FORMAT STORAGE MEDIA VOLUME

(75) Inventors: Kenichi Tezuka, Yokohama (JP);
Junichi Takahashi, Yokohama (JP);
Takuya Mizokami, Yokohama (JP)

(73) Assignee: Hitachi Software Engineering Co., Ltd., Yokohama-shi (JP)

( * ) Notice: Subject to any disclaimer, the term of this patent is extended or adjusted under 35 U.S.C. 154(b) by 839 days.

(21) Appl. No.: 10/101,212

(22) Filed: Mar. 20, 2002

(65) Prior Publication Data

US 2002/0141296 A1   Oct. 3, 2002

(30) Foreign Application Priority Data

Mar. 30, 2001   (JP) .............................. 2001-100730

(51) Int. Cl.
*G06F 12/00* (2006.01)
(52) U.S. Cl. .................................................... 711/114
(58) Field of Classification Search ............. 369/30.2, 369/30.28, 30.29, 30.19, 30.3, 30.05, 30.06, 369/30.22; 711/111, 112; 707/205
See application file for complete search history.

(56) References Cited

U.S. PATENT DOCUMENTS

| | | | | |
|---|---|---|---|---|
| 5,155,835 A | * | 10/1992 | Belsan ........................ | 711/114 |
| 5,390,313 A | * | 2/1995 | Yanai et al. ................. | 711/112 |
| 5,403,639 A | * | 4/1995 | Belsan et al. ............... | 707/204 |
| 5,430,855 A | * | 7/1995 | Walsh et al. ................. | 710/10 |
| 5,689,481 A | * | 11/1997 | Tamura et al. ........... | 369/30.06 |
| 5,819,310 A | * | 10/1998 | Vishlitzky et al. ........... | 711/114 |
| 5,835,939 A | * | 11/1998 | Kurokawa et al. ........... | 711/113 |
| 5,897,661 A | * | 4/1999 | Baranovsky et al. ........ | 711/170 |
| 6,105,118 A | * | 8/2000 | Maddalozzo et al. ....... | 711/167 |
| 6,292,626 B1 | * | 9/2001 | Ino et al. ..................... | 386/125 |
| 6,321,239 B1 | * | 11/2001 | Shackelford ................ | 707/206 |
| 6,360,232 B1 | * | 3/2002 | Brewer et al. .............. | 707/204 |
| 6,400,657 B1 | * | 6/2002 | Soeda et al. ............. | 369/30.06 |
| 6,404,707 B1 | * | 6/2002 | Kaneda et al. ........... | 369/30.06 |
| 6,577,562 B2 | * | 6/2003 | Gallo et al. .............. | 369/30.63 |
| 6,643,667 B1 | * | 11/2003 | Arai et al. ................... | 707/200 |
| 6,662,197 B1 | * | 12/2003 | LeCrone et al. ............ | 707/204 |
| 6,792,503 B2 | * | 9/2004 | Yagi et al. .................. | 711/112 |
| 6,880,058 B2 | * | 4/2005 | Mizuno et al. ............. | 711/114 |

FOREIGN PATENT DOCUMENTS

| | | | | |
|---|---|---|---|---|
| JP | 2000-137639 | * | 5/2000 | ................. 711/114 |
| JP | 2001-092703 | | 4/2001 | |

* cited by examiner

*Primary Examiner*—Tan Dinh
(74) *Attorney, Agent, or Firm*—Crowell & Moring LLP

(57) ABSTRACT

In an additional writing format optical disk library unit or the like, the processing for automatically reorganizing a volume is carried out effectively so as to intend to reuse media. Whether the number of residual blank media surfaces in a volume is small is judged. If the number is small, media surfaces each having a low data valid rate are extracted from the volume. Valid data on the extracted media surfaces is written and added to a medium surface which is currently set as a writing target, so that data relocation is carried out. Media surfaces occupied only by invalid areas are deregistered from the volume. Further, the media surfaces deregistered from the volume are formatted. The formatted media surfaces are re-registered into the volume.

22 Claims, 11 Drawing Sheets

FIG. 4

FILE MANAGEMENT INFORMATION DB
TABLE SPECIFICATIONS          211

| ITEM NAME | SETTING CONTENT | ATTRIBUTION |
|---|---|---|
| VOLUME ID | TARGET VOLUME ID | NUMERIC |
| VOLUME NAME | TARGET VOLUME NAME | CHARACTER STRING |
| MOUNT POINT | NAME OF PATH MOUNTED WITH VOLUME | CHARACTER STRING |
| DISK SURFACE DEVICE ID1 | HEAD DISK SURFACE ID WHICH CONSTITUTES VOLUME | NUMERIC |
| DISK SURFACE DEVICE ID2 | SECOND DISK SURFACE ID WHICH CONSTITUTES VOLUME | NUMERIC |
| ⋮ | ⋮ | |
| DISK SURFACE DEVICE IDn | n-TH DISK SURFACE ID WHICH CONSTITUTES VOLUME | NUMERIC |

212

| ITEM NAME | SETTING CONTENT | ATTRIBUTION |
|---|---|---|
| VOLUME ID | TARGET VOLUME ID | NUMERIC |
| DISK SURFACE DEVICE ID | DISK SURFACE ID BELONGING TO VOLUME | NUMERIC |
| TOTAL NUMBER OF FILES | TOTAL NUMBER OF FILES STORED IN TARGET DISK SURFACE | NUMERIC |
| DATA VALID RATE | DATA VALID RATE OF TARGET DISK SURFACE | NUMERIC |

213

| ITEM NAME | SETTING CONTENT | ATTRIBUTION |
|---|---|---|
| VOLUME ID | TARGET VOLUME ID | NUMERIC |
| DISK SURFACE DEVICE ID | DISK SURFACE ID BELONGING TO VOLUME | NUMERIC |
| FILE ID | UNIQUE FILE NUMBER IN VOLUME | NUMERIC |
| FILE NAME | EXISTING FILE NAME (FULL PATH NAME FROM MOUNT POINT) | CHARACTER STRING |
| ADDRESS IN DISK | PHYSICAL ADDRESS WHERE FILE EXISTS | NUMERIC |

METHOD FOR REORGANIZING ADDITIONAL WRITING FORMAT STORAGE MEDIA VOLUME

BACKGROUND OF THE INVENTION

1. Field of the Invention

The present invention relates to a method for reorganizing a volume in an optical disk library unit or any other storage media library unit operating on an additional writing format.

2. Description of the Related Art

Saving data for a long time is used in a wide range of applications, such as drawings, slips, documents, forms, etc. To retain data for a long time, optical disks are often used due to their low bit cost (reduction in cost per unit storage capacity) and their long-term retention property. Particularly as the capacity of data increases, it is more often that an optical disk library unit is used to make up a large-capacity volume constituted by a plurality of disks.

An optical disk library unit is connected to a server of a personal computer or a work station through an interface such as an SCSI. Generally, a plurality of disks in the optical disk library unit are integrated and arranged into a large-capacity logical volume (hereinafter, referred to as "volume" simply). Thus, a user can access as one volume without recognizing the disks individually.

To integrate a plurality of disk surfaces into one volume in the optical disk library unit, any file is usually written like a postscript. That is, even when a file is updated by data overwriting or the like, the file is rewritten at the tail without using its original space. As a result, it is possible to write a file or to read an updated file without searching the plurality of disks. In the case where an optical disk library unit is used to make up a volume constituted by a plurality of disks, in addition to the low access performance of optical disks, there may occur an overhead due to a mechanical operation in the library unit. Therefore, it becomes an important factor on performance that searching the plurality of disks can be avoided in processing such as writing a file. Information as to which disk valid data belongs to and where the valid data is located in the disk is retained separately as file management information on a server. Thus, a user can acquire target valid data without accessing all the disks directly.

However, in an optical disk volume operating on an additional writing format, an invalid area increases in the volume as the quantity of updated or deleted files increases. In addition, the consumption of capacity in the optical disk volume operating on an additional writing format is faster than that of a volume using magnetic disks. Therefore, a system manager has to monitor the residual capacity of the volume periodically and endeavor to increase the capacity of the volume, for example, by adding a new medium to the volume, if the capacity is insufficient. Thus, the system manager is required to engage in such troublesome work. To avoid such work, it is necessary to relocate data in the volume automatically, for example, periodically.

In the related art, an automated method is adopted for relocating data in a volume constituted by a plurality of disks in an optical disk library unit. That is, invalid areas lying idle due to update or deletion are padded with valid data sequentially from a disk surface located at the head of the volume.

However, in this method, there is a problem that if the volume size increases due to increase in the number or density of disks, it takes enormous time to pad the disks with all the valid data. Further, access to the volume is inhibited during the processing for data relocation. Thus, there is a problem that it is inevitable to stop normal operation for about one or two weeks in accordance with the volume size.

In addition, in the method in which disk surfaces from the head of the volume sequentially are padded with valid data, written data is moved consequentially. Therefore, there is a fear that data is lost if the processing is interrupted carelessly due to a fault in hardware or the like during data relocation.

Further, in consideration of processing for reorganizing a volume, there occurs a problem in system resources occupation when a series of processes such as data relocation, deregistration of disk surfaces occupied only by invalid areas from the volume, formatting of the disk surfaces and addition of the disk surfaces to the volume are carried out. For example, at least two drives are occupied on read and write sides in data relocation, and one drive is occupied during formatting.

SUMMARY OF THE INVENTION

In an optical disk library unit or any other storage media library unit generally using a plurality of media integrated into one logical volume, it is an object of the present invention to automatically relocate an invalid area of an optical disk volume or the like generated in operation without bothering a system manager and to reedit the volume to thereby expand the volume capacity.

More particularly, it is another object of the invention to provide a method for automatically reorganizing a volume in an optical disk library unit or the like using an additional writing format writing system as follows. That is, processing for relocating data is performed without re-padding media from the head sequentially with valid data. The processing is easy to apply to a real operation and low in risk of data loss. In addition, when the volume is reorganized, the minimum requirement for processing of relocation is carried out with reference to the number of virgin media in the volume and the data valid rates of media.

It is another object of the invention to provide a method for reorganizing a volume in an optical disk library unit or any other storage media library unit generally using a plurality of media integrated into one logical volume, as follows. That is, volume reorganization is performed without re-padding media from the head sequentially with valid data. The method is easy to apply to a real operation and low in risk of data loss.

According to the invention, only valid data on media surfaces subjected to data relocation is added sequentially to a medium surface currently set as a writing target in the volume. Consequently, media occupied only by invalid areas are released from volume management. These media are formatted again to be able to be reused. Thus, each volume can be constituted by a minimum number of disks so that the effective capacity of the entire library can be expanded. In addition, written data is left on its original media surfaces as it is. Therefore, even if the processing for relocation is interrupted carelessly due to a hardware fault or the like, there occurs no loss in data.

In the processing for volume reorganization, data relocation is carried out, and resulting media occupied only by invalid areas are deregistered from the volume. Further, the media are formatted again and re-registered at the tail of the volume. It is, however, undesirable to carry out a series of processes frequently in operation because the processes such as data relocation and formatting, which occupy drives and require much time, are carried out continuously.

Therefore, according to the invention, the number of blank media (surfaces) residual in each target volume and the data valid rate of each medium (surface) registered in the volume are checked before the above-mentioned series of processes. Then, the processes are carried out only on volumes and media (surfaces) needing the processes. Thus, processing for automatic volume reorganization is realized to minimize the load on a manager and the system.

In addition, according to the invention, an additional writing system is used for writing data into a volume in the same manner as in the related art. In response to an instruction to relocate data, data is read out sequentially from a medium surface at the head, and whether the data is valid or invalid is judged with reference to file management information. Only valid data is then added to the tail of the volume. Resulting media occupied only by invalid areas are released from volume management. These media are formatted again to be able to be reused. Thus, each volume is constituted by a minimum number of disks so that the effective capacity of the entire library can be expanded. This method is effective in the case where each volume is constituted by a plurality of media, and the relocation is terminated when the processing is carried out on the surface one before the last surface. In one embodiment, one volume is constituted by groups of media in libraries belonging to difference classes; and further valid data on media in one of said libraries may be copied to media in another library sequentially by data relocation so that media to manage in said one of said libraries are finally removed.

To relocate data on schedule without stopping normal operation, there has to be created a mechanism as follows. That is, data relocation can be started while the volume is placed online. If a normal access request is issued, the data relocation can be interrupted and then resumed. To this end, to which medium the processing has been carried out (relocation termination medium address) and to what extent the processing has been carried out in the medium are reserved when the relocation is terminated. Then, when next relocation is resumed, the relocation will start at the reserved position.

In addition, written data is left in its original media surfaces as it is. Therefore, even if the processing for relocation is interrupted carelessly due to a hardware fault or the like, there occurs no loss in data. At least the processing for relocation up to the relocation termination medium address managed by control software in a server has been completed. It will therefore go well if the processing for relocation is resumed from the relocation termination medium address.

Next, consider that different storage media libraries are placed under the same management with the control software, and one volume can be constituted by media in the respective libraries. The volume is divided into the first half and the second half for the libraries of the constituting media. Thus, data can be migrated from media constituting the first half to media constituting the second half. If such processing is carried out on the entire volume, all the media of the library constituting the first half media become an invalid area. Those media are then released from the volume management. Thus, data migration from one library to the other library can be attained.

In addition, in a method in which only media having plenty of invalid areas are selected and closed up, a value of invalid capacity is set as a criterion for performing data relocation in advance. Data relocation is then performed only on media having invalid areas above the set value. The valid/invalid area capacity of each medium constituting the volume is always managed by the control software. If data relocation is started, only the corresponding media are subjected to the processing. This results in efficient data relocation. In a further embodiment, only a group of media most of which are occupied by invalid areas is selected from said logical volume; data relocation is carried out on said group of media; and said media are released from volume management.

BRIEF DESCRIPTION OF THE DRAWINGS

FIG. 4 is a diagram showing an example of a format of a file management information database for volumes;

DETAILED DESCRIPTION OF THE PREFERRED EMBODIMENTS

Embodiments of the invention will be described below with reference to the drawings. Incidentally, a storage media library unit operating on an additional writing format is aimed at an optical disk library unit in the embodiments.

Figure 1:
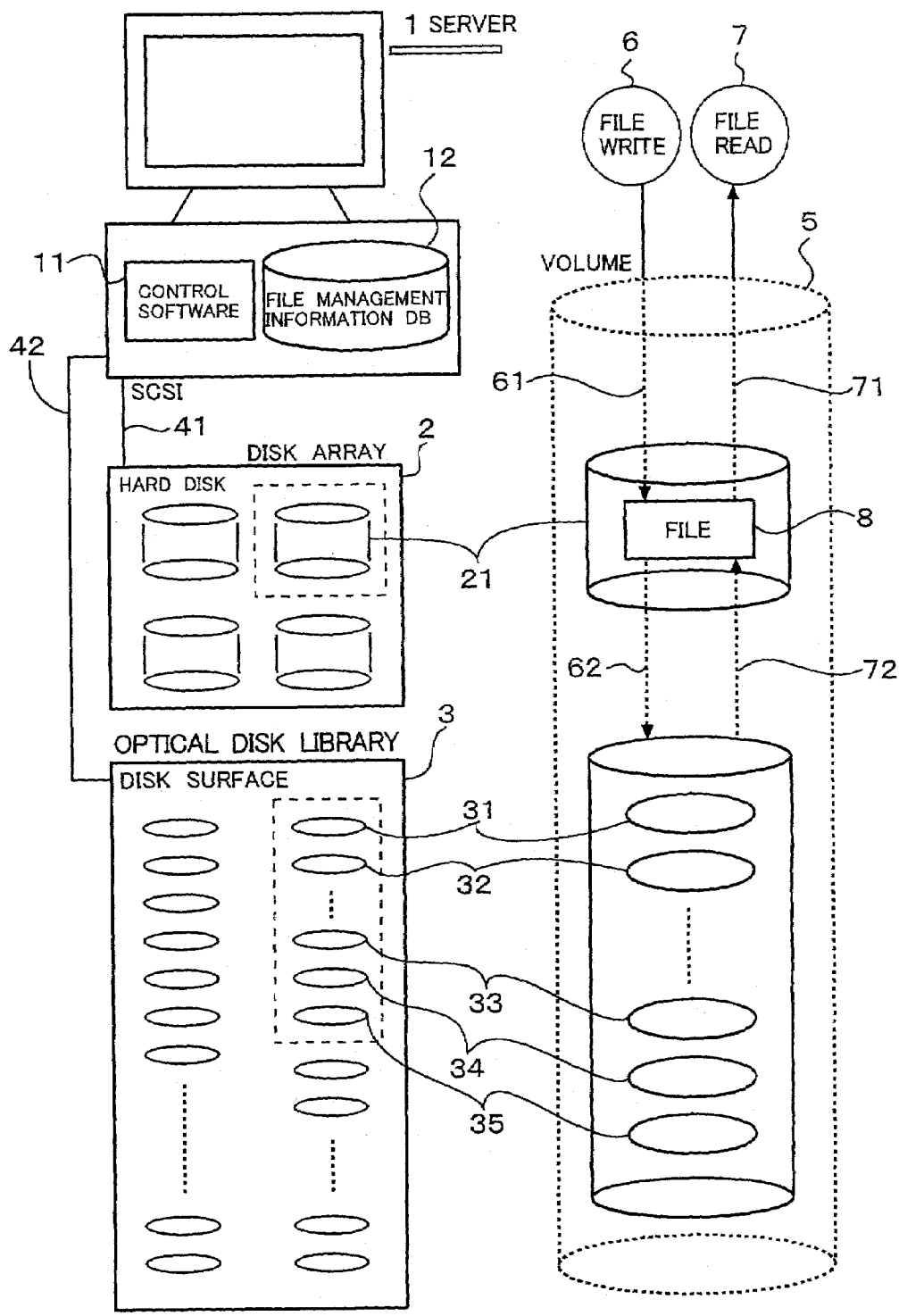
FIG. 1 is a diagram showing an example of the configuration of a system to which an optical disk library unit according to an embodiment of the invention is applied.

FIG. 1 shows an example of the configuration of a system using an optical disk library unit. In FIG. 1, a disk array 2 and an optical disk library unit (hereinafter referred to as "optical disk library") 3 are connected to a server 1 through interface cables 41 and 42 such as SCSI respectively. The server 1 is a PC or a workstation. Hierarchical storage is constituted by the disk array 2 and the optical disk library 3. Control software 11 and a file management information database (DB) 12 exist in the server 1. The control software 11 performs controlling of data relocation and volume reorganization for the optical disk library 3 in addition to controlling of access to the disk array 2 and the optical disk library 3. The file management information database 12 retains a directory structure of files.

By the control of the control software 11 installed in the server 1 in advance, a plurality of disks put in the optical disk library 3 are grouped in surface unit so as to form one volume. By handling the disks in surface unit, it is also possible to deal with optical disks each having double sides available. The example of FIG. 1 shows that disk surfaces 31, 32, . . . , 33, 34 and 35 in the optical disk library 3 are grouped.

Further, the control software 11 carries out the following control. That is, a hard disk in the disk array 2 is allocated as a cache to the volume of the optical disks. Frequently accessed data is placed in the high-speed hard disk while infrequently accessed data is reserved in the low-speed optical disks. Thus, hierarchical storage management is also realized for enhancing the total access performance. The example of FIG. 1 shows that the disk surfaces 31, 32, . . . , 33, 34 and 35 in the optical disk library 3 are grouped while a hard disk 21 in the disk array 2 is allocated as a cache to the group so that a volume 5 is formed.

Here, when WRITE into a file 8 of the volume 5 is issued to the volume 5 (6), data is first written into the cache 21 (61) as a process of the control software 11. If predetermined time has passed between the update date and time of the file and the current time, the control software 11 concludes that the data has been settled for the file. The control software 11 then copies the data into a corresponding optical disk with reference to the file management information database 12 (62). This is called file update of an optical disk. When READ from the file 8 is issued to the volume 5 (7), the control software 11 reads the data from the cache 21 (71) if the data exists in the cache 21. If the data is absent from the cache, the control software 11 copies the data from a corresponding optical disk to the cache 21 with reference to the file management information database 12 (72), and then reads the data from the cache (71). In this case, the file on the optical disk is left valid. After that, when the file is returned from the cache (the file on the optical disk is updated), the file (old data) on the optical disk is made invalid.

Figure 2:
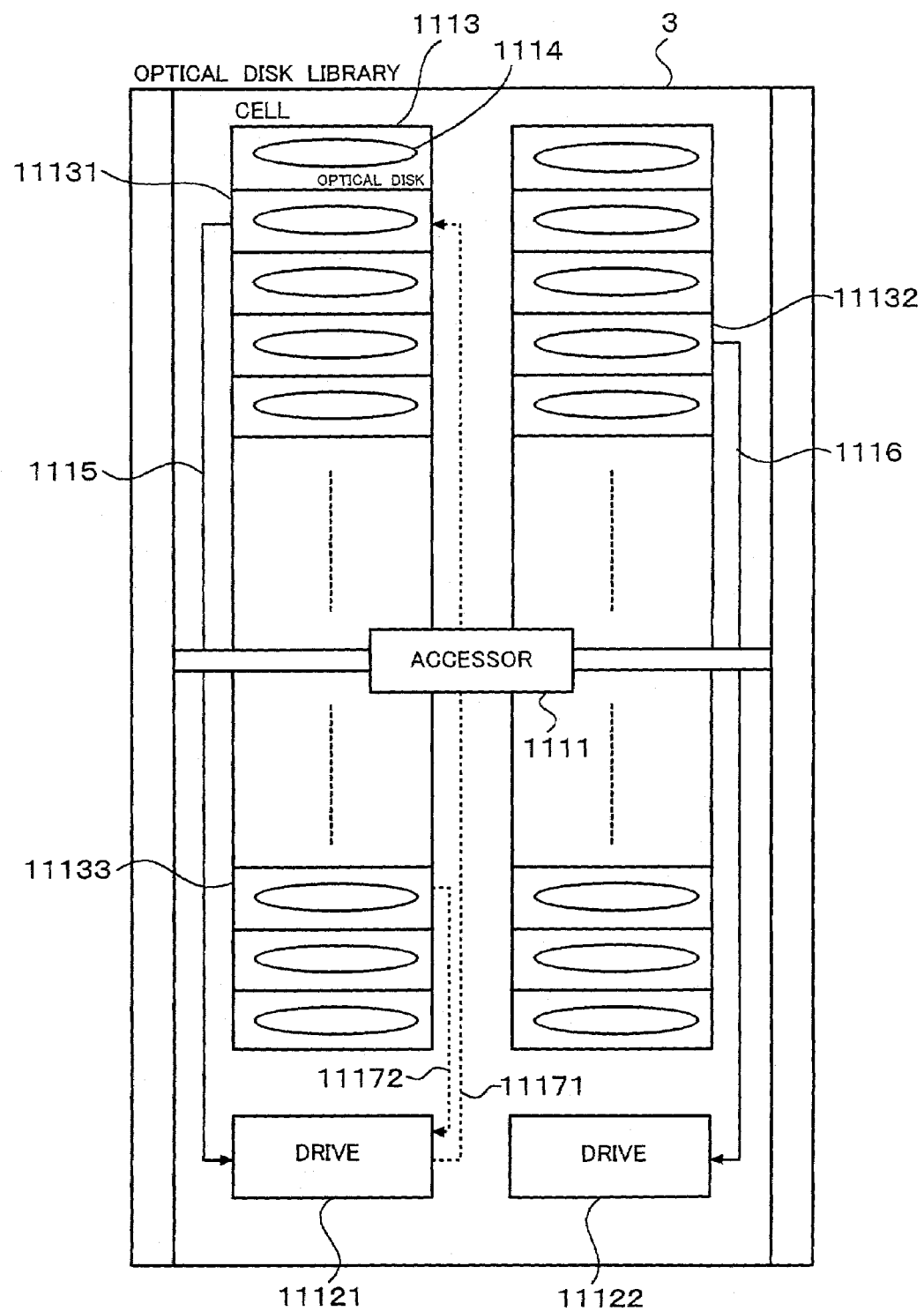
FIG. 2 is a diagram showing the overview of the structure of an optical disk library.

FIG. 2 shows an example of the configuration of the optical disk library 3. The optical disk library 3 is usually constituted by an accessor (1111), a plurality of drives (11121 and 11122) and a plurality of cells (1113) as shown in FIG. 2. An optical disk 1114 is stored in each of the cells. Here, assume that access to an optical disk in the cell 11131, access to an optical disk in the cell 11132 and access to an optical disk in the cell 11133 occur in this order. Then, processing is carried out in the following sequence under the control of the control software 11.

(1) The accessor 1111 moves the optical disk in the cell 11131 to the drive 11121 (1115) so as to carry out I/O processing.
(2) The accessor 1111 moves the optical disk in the cell 11132 to the drive 11122 (1116) so as to carry out I/O processing.
(3) The accessor 1111 moves the optical disk from the drive 11121 back to the cell 11131 (11171), and then moves the optical disk in the cell 11133 to the drive 11121 (11172) so as to carry out I/O processing.

Figure 3:
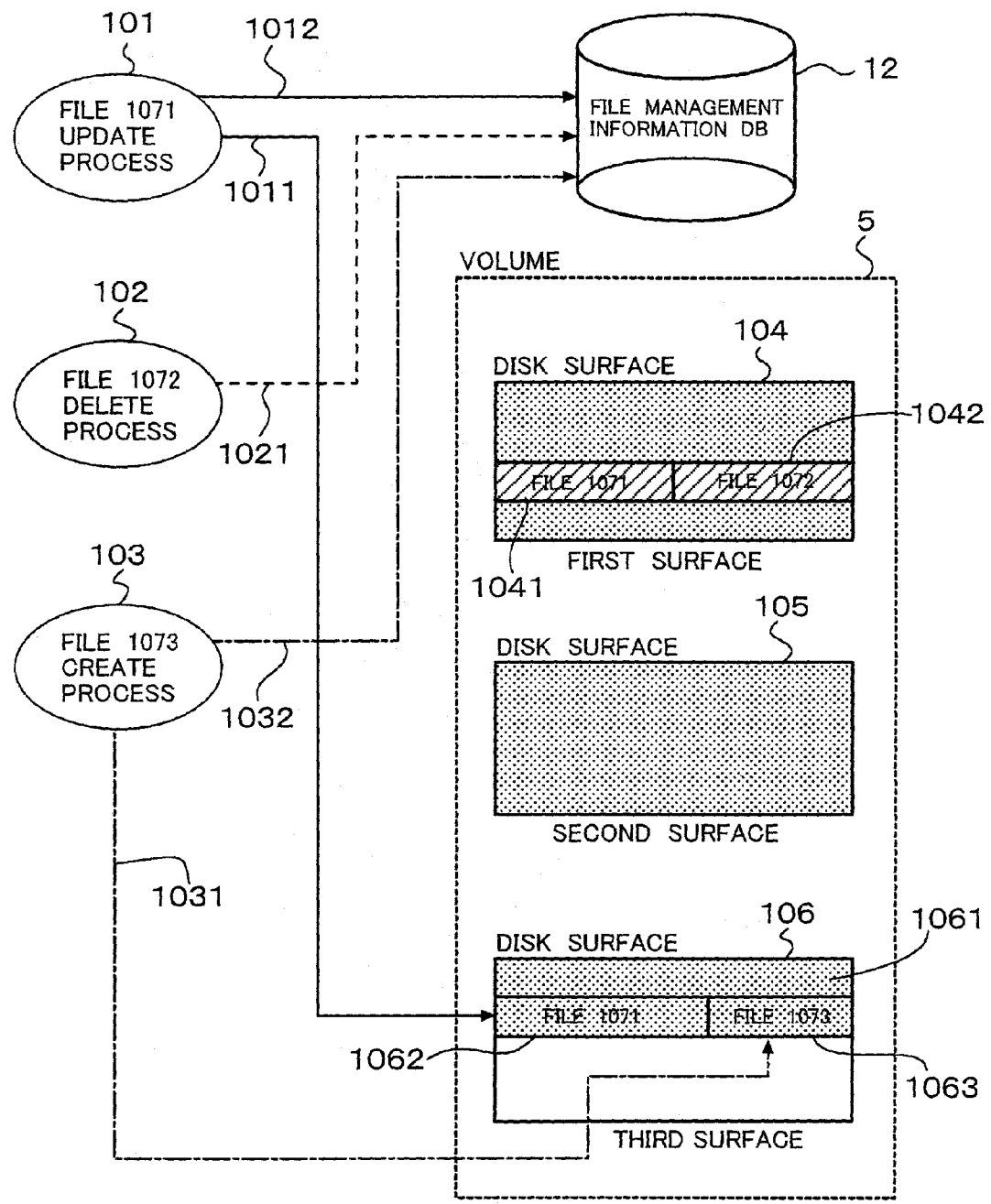
FIG. 3 is a diagram for explaining processing for additional writing format writing of a volume.

Next, description will be made about data access control of the optical disk library 3 with reference to FIG. 3. The directory structure of files is retained in the file management information database 12, and data of the files is reserved in the optical disks. Because additional writing format control is provided for the optical disks, new data and old data from one and the same file are present when a process of file update of an optical disk occurs (that is, writing an updated file from a cache into an optical disk). Therefore, a valid data address is retained for each file in the file management information database 12 so that access to target file data can be gained.

Description will be made along the example of FIG. 3. Assume that data has been written up to an area 1061 of a disk surface 106 in a volume 5 constituted by three disk surfaces 104, 105 and 106. Here, when there appears a request to update a file 1071 existing in the disk surface 104 of the volume 5 (101), the control software 11 writes new data (updated file) into an area 1062 in the disk surface 106 (1011), and changes the physical address of the file 1071 in the file management information database 12 from an area 1041 of the disk surface 104 into the area 1062 of the disk surface 106 (1012). As a result, the old data area 1041 for the file 1071 in the disk surface 104 becomes an invalid area. On the other hand, when there appears a request to delete a file 1072 existing in the volume 5 because of the file 1072 unused for a long time or the like (102), the control software 11 deletes information about the file 1072 from the file management information database 12 (1021). Thus, an area 1042 of the disk surface 104 becomes an invalid area, which means the file 1072 has been deleted from the volume 5. Further, when a new file 1073 is created in the volume 5 in response to a request from a user or the like (103), the control software 11 writes data into an area 1063 of the disk surface 106 (1031), and information of the file 1073 is added to the file management information database 12 (1032).

FIG. 4 shows an example of a format of a directory relating to an optical disk library in the file management information database 12. Incidentally, the directory of the cache has no direct relationship to the invention, and hence it is omitted here.

The file management information database 12 relates to an optical disk library. The file management information database 12 is constituted by a table 211, a table 212 and a table 213 as shown in FIG. 4. The table 211 shows ID information of disk surfaces constituting a volume, and so on. The table 212 shows the total number of files existing in each disk surface, the valid rate (data valid rate) of the disk surface, and so on. The table 213 shows a physical address of each file, and so on. A record of the table 211 is provided for each volume. Records of the table 212 are provided so that the number of the records corresponds to the number of the disk surfaces constituting the volume. Records of the table 213 are provided so that the number of the records corresponds to the number of the files stored in the disk surfaces. If a process of creating a file occurs, a record is added to the table 213 in the file management information database 12. If a process of deleting a file occurs, the corresponding record is deleted from the table 213. If a process of updating a file occurs, a disk surface physical address corresponding to the record of the table 213 is updated.

If processing for data relocation is carried out, valid physical addresses in the table 213 are acquired correspondingly to the total number of files existing in the table 212 for each disk surface on the basis of the disk surface ID information in the table 211. If the whole area of a disk surface becomes invalid, the total number of files existing in the disk surface in question in the table 212 becomes 0, and no records having the disk surface ID in question exist in the table 213. Here, if the disk surface is further released from volume management, the corresponding disk surface device ID information in the table 211 and the corresponding record in the table 212 are deleted.

Next, description will be made about the processing for data relocation. The control software 11 in the server 1 is also engaged in controlling data relocation. The invention adopts a method in which valid data subject to relocation is added to a disk surface which is currently a writing target in the same volume.

Figure 5:
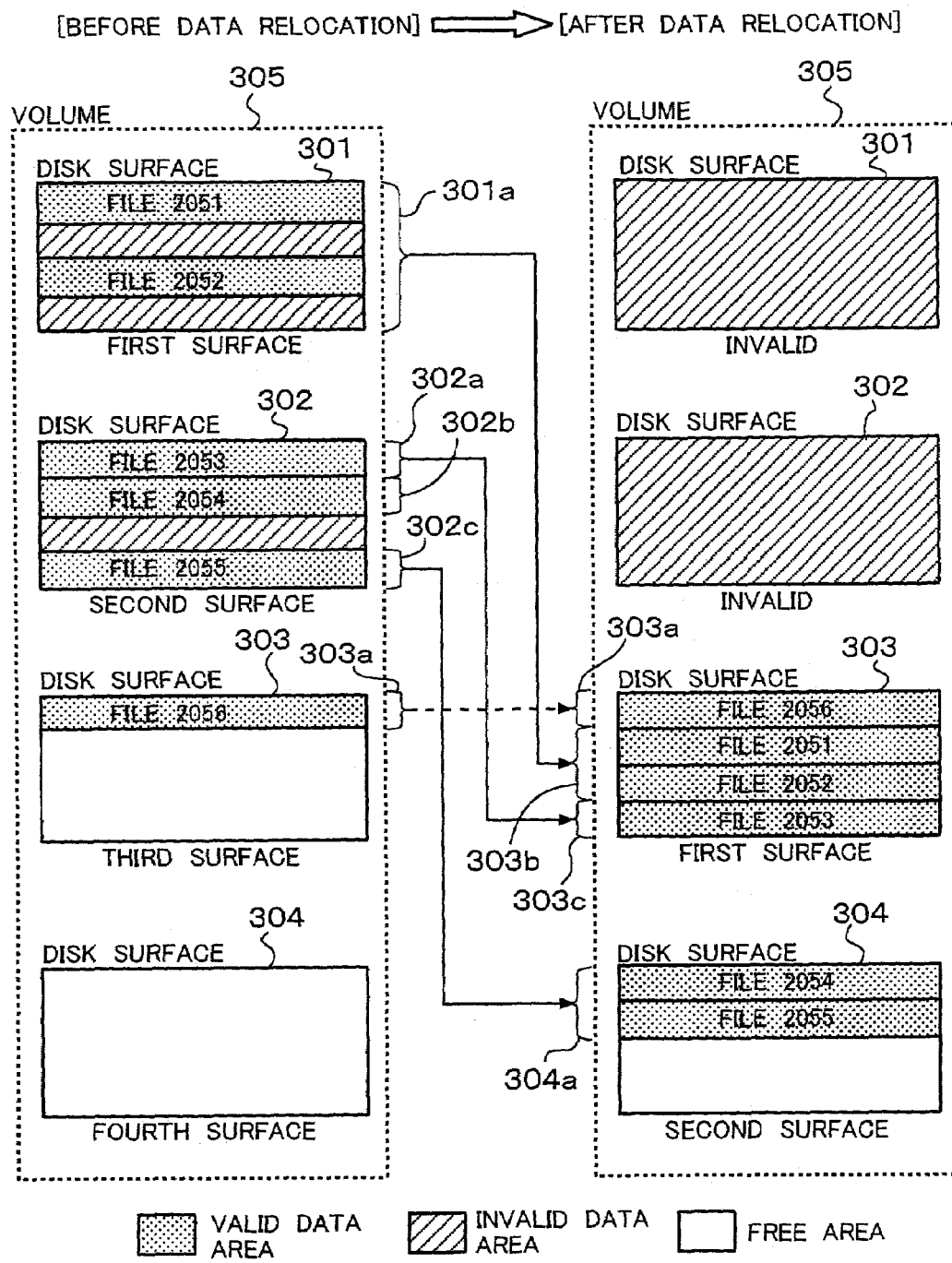
FIG. 5 is a diagram for explaining processing for data relocation to which the invention is applied.

FIG. 5 is a diagram for explaining the processing for data relocation. Here, assume that a volume 305 is constituted by disk surfaces 301, 302, 303 and 304. In addition, assume that files 2051 to 2056 of valid data exist here and there in the disk surfaces 301, 302 and 303 before data relocation as shown on the left of FIG. 5. Further, assume that the disk surface 303 is the disk surface to be written currently, and the disk surface 304 is virgin (blank). When data relocation is performed on the volume 305 constituted thus by the disk surfaces 301, 302, 303 and 304, a file 2056 in an area 303a of the disk surface 303 which is currently set as a target for writing is first set as valid data (last written data) as it is. Then a file 2051 and a file 2052 which are valid data in an area 301a of the disk surface 301 are added to the last data address of the disk surface 303, that is, written into an area 303b immediately after the area 303a of the file 2056. Next, a file 2053 which is valid data in an area 302a of the disk surface 302 is written into a residual area 303c of the disk surface 303, and files 2054 and 2055 in areas 302b and 302c of the disk surface 302 are written into a head area 304a of the next disk surface 304. During this process, the file management information is also updated so that all the disk surfaces 301 and 302 are set as invalid areas. As a result, the volume 305 is formed as shown on the right of FIG. 5 after the data relocation. The disk surfaces 301 and 302 can be, if necessary, released from management of the volume 305 and formatted to be reused.

Next, description will be made about how to apply such processing for data relocation to practical use. First, the processing for data relocation has a basic policy not to relocate all data in a volume at one time but to relocate the data little by little every day. It is therefore possible to perform the processing for data relocation in a normal job schedule. To this end, a command to explicitly start the processing for data relocation and a command to explicitly stop the processing for data relocation are prepared so that the processing for data relocation can be handled as one job. Thus, the processing for data relocation can be scheduled in the overall system operation by time designation or job sequence setting. The timing at which the processing for data relocation is terminated is when the command to stop data relocation is inputted, when the processing for data relocation is finished, or when a normal writing operation occurs. In addition, even if such a termination condition occurs, the process of data relocation may be terminated after a process of writing one file has been finished. Thus, associated data is located continuously so that the access performance can be expected to be improved. Therefore, a mode for terminating the processing for data relocation after ongoing file data has been written, and a mode for terminating the processing of data relocation forcedly are prepared for the stop command.

At the termination of the processing for data relocation, a point (disk address and file name) indicating which disk surface the processing for data relocation has proceeded and to what extent the processing for data relocation has proceeded in the disk surface, is reserved (for example, retained in the file management information database 12). The point is used as a point for new processing for normal writing in the future or a point for starting the next processing for data relocation.

Basically there is no necessity to access a disk surface made invalid in the processing for data relocation. Thus, such a disk surface can be released from management even if the volume is in an online state. However, if the double sides of the disk are used, the disk is released from management after both the sides become invalid.

If the capacity is insufficient for writing in normal operation and for writing in data relocation, a formatted disk imported into the library in advance is designed to automatically add to the volume under the control of the control software 11. In addition, there is also required a function to always monitor the capacity of the volume and the number of formatted disks which can be added and to message a system manager when the number of formatted disks is reduced. Incidentally, if the capacity is full during data relocation and there is no disk that can be added, a warning message is issued but the processing for data relocation itself is terminated normally. Therefore, required capacity should be confirmed before data writing, so as to prevent the processing for data relocation from being terminated on the way of a file.

Figure 6:
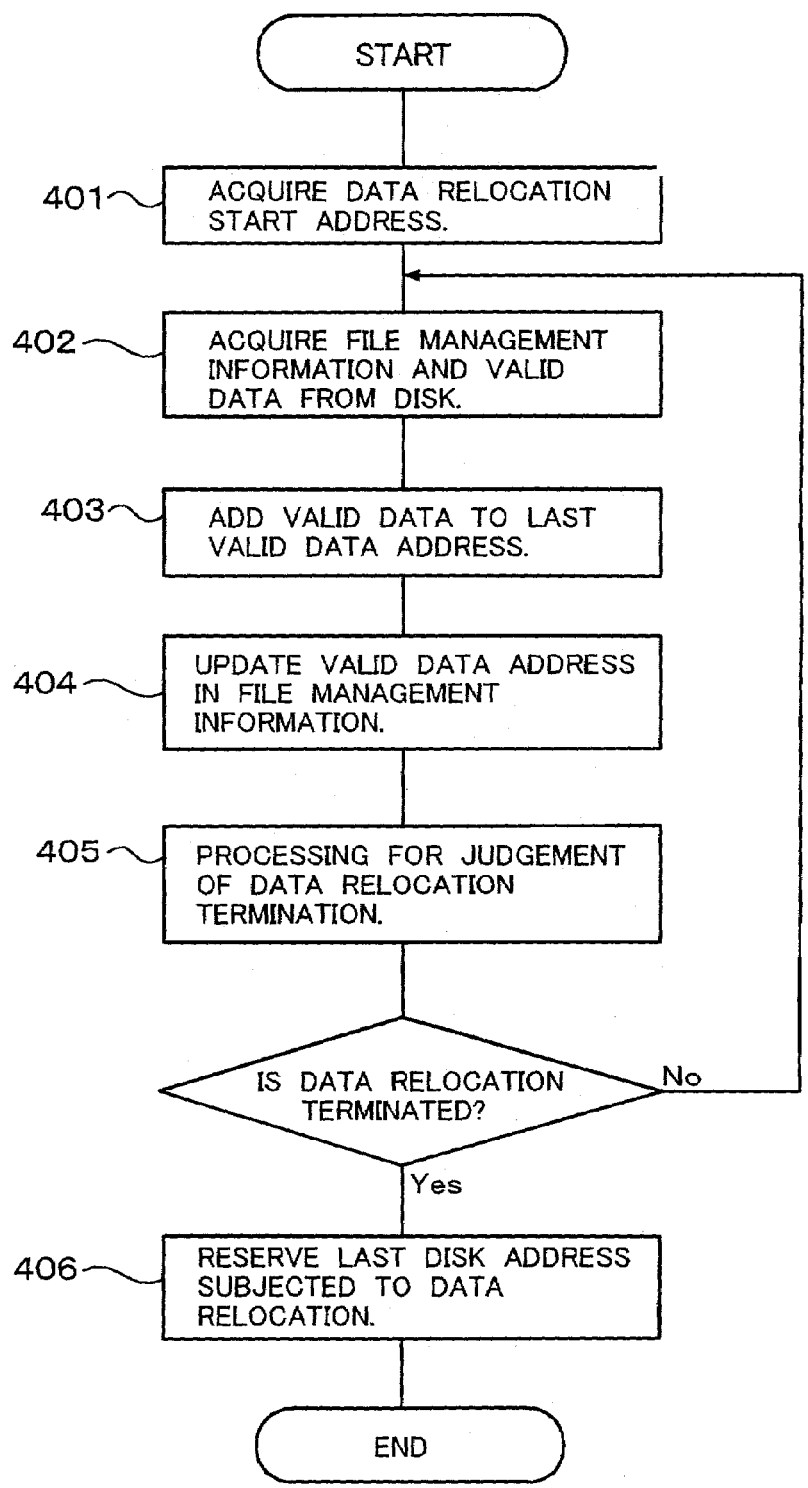
FIG. 6 is a flow chart showing an example of the processing for data relocation.

FIG. 6 shows an example of a flow chart of the processing for data relocation based on the previous description. First, the processing is started in response to a data relocation start command. Here, an address with which previous data relocation was terminated is acquired, and set as a processing start address (Step 401). When the processing is started newly, a head address of a head disk surface in the volume is set as a start address. Next, valid data is acquired from the disk surface with reference to the file management information in the file management information database 12 (Step 402). Basically, as shown in FIG. 4, valid data information is managed every disk surface in the file management information database 12, and there is no necessity to access the whole area of the disk surface. Next, the acquired valid data is added to the last data address of the volume (Step 403), while the physical address of the file in the file management information is changed into a new address of the added data (Step 404). Here, it is checked whether the processing for data relocation is terminated or not. If a data relocation stop command is inputted or a notification of termination is received due to a normal writing operation, or if the processing for data relocation has been finished, termination of the processing for data relocation is determined (Step 405). In any other case, the processing for data relocation is judged to be continued, and the processing returns to Step 402, commencing with acquiring valid data again. When the processing for data relocation is terminated, a disk surface address where the data relocation is terminated is reserved and set as a start address for the next processing for data relocation or as a start address for the next processing for normal data writing. If the data relocation is finished, the next processing for data relocation is started at the head disk surface of the volume (Step 406). If a notification of termination is received forcedly during data writing of one file, the processing interrupts Step 404 and moves to Step 406 after matching the file management information with the state of writing on the disk surfaces.

Figure 7:
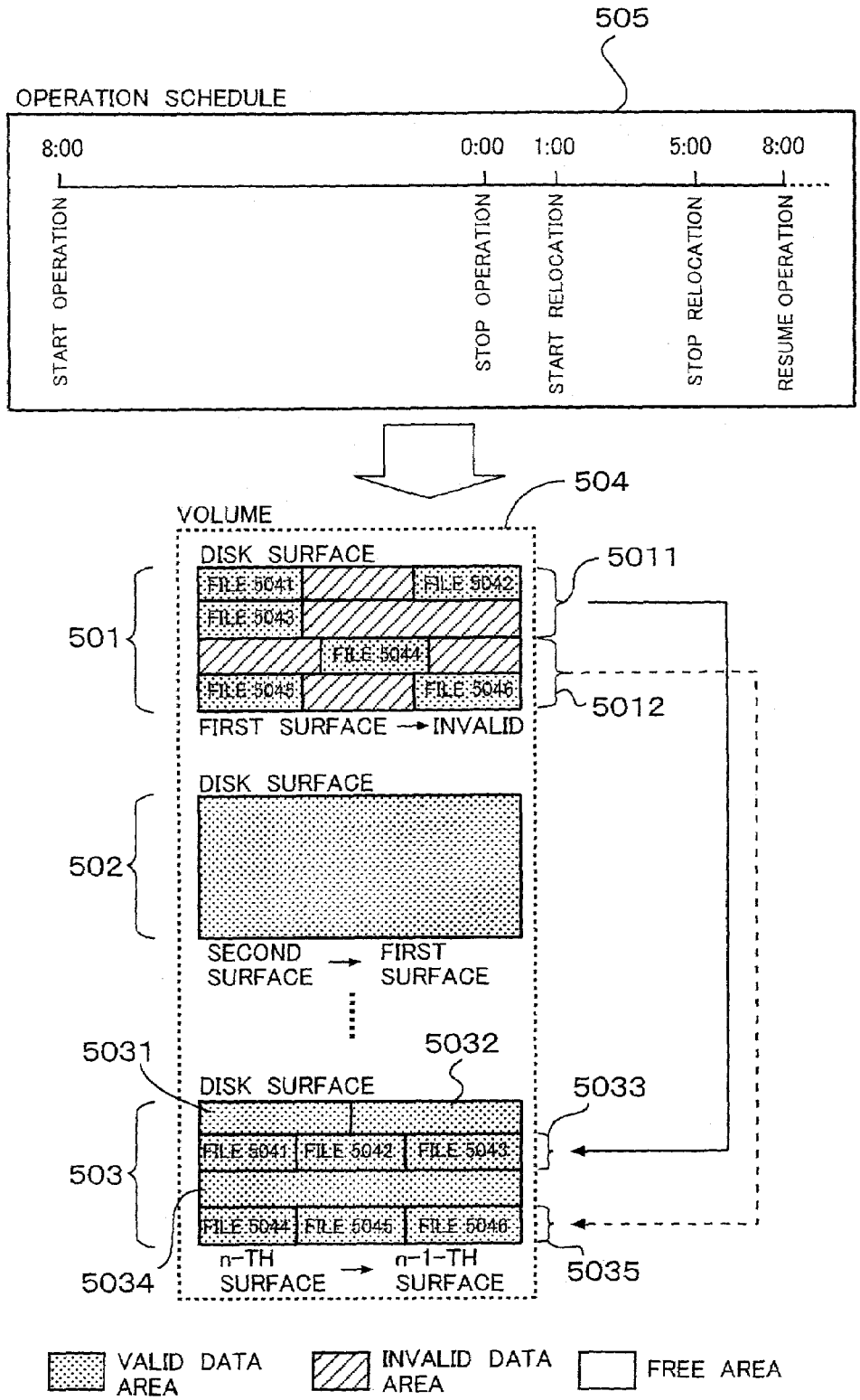
FIG. 7 is a diagram showing an example in which the processing for data relocation is placed on practical operation.

FIG. 7 shows an example in which the processing for data relocation has been incorporated in a practical operation schedule. In this example, normal operation is carried out from 8 o'clock to 0 o'clock. Then, with a margin of one hour, data relocation is carried out from 1 o'clock, and an instruction to terminate the data relocation is issued at 5 o'clock (Operation Schedule 505). A volume 504 is an example which is applied to such operation. Assume that the volume 504 is constituted by disk surfaces 501, 502, . . . , and 503, and data has been written up to an area 5031 of the disk surface 503. At this time, data is first written into an area 5032 of the disk surface 503 in the normal operation, and then files 5041, 5042 and 5043 which are valid data in the disk surface 501 are written into an area 5033 of the disk surface 503 in the processing for data relocation. Then, data is written into an area 5034 of the disk surface 503 in the next normal operation, and then files 5044, 5045 and 5046 which are valid data in the disk surface 501 are written into an area 5035 of the disk surface 503 in the next processing for data relocation. As a result, the whole of the disk surface 501 becomes an invalid area, and the disk surface 502 is set as a new first surface.

Figure 8:
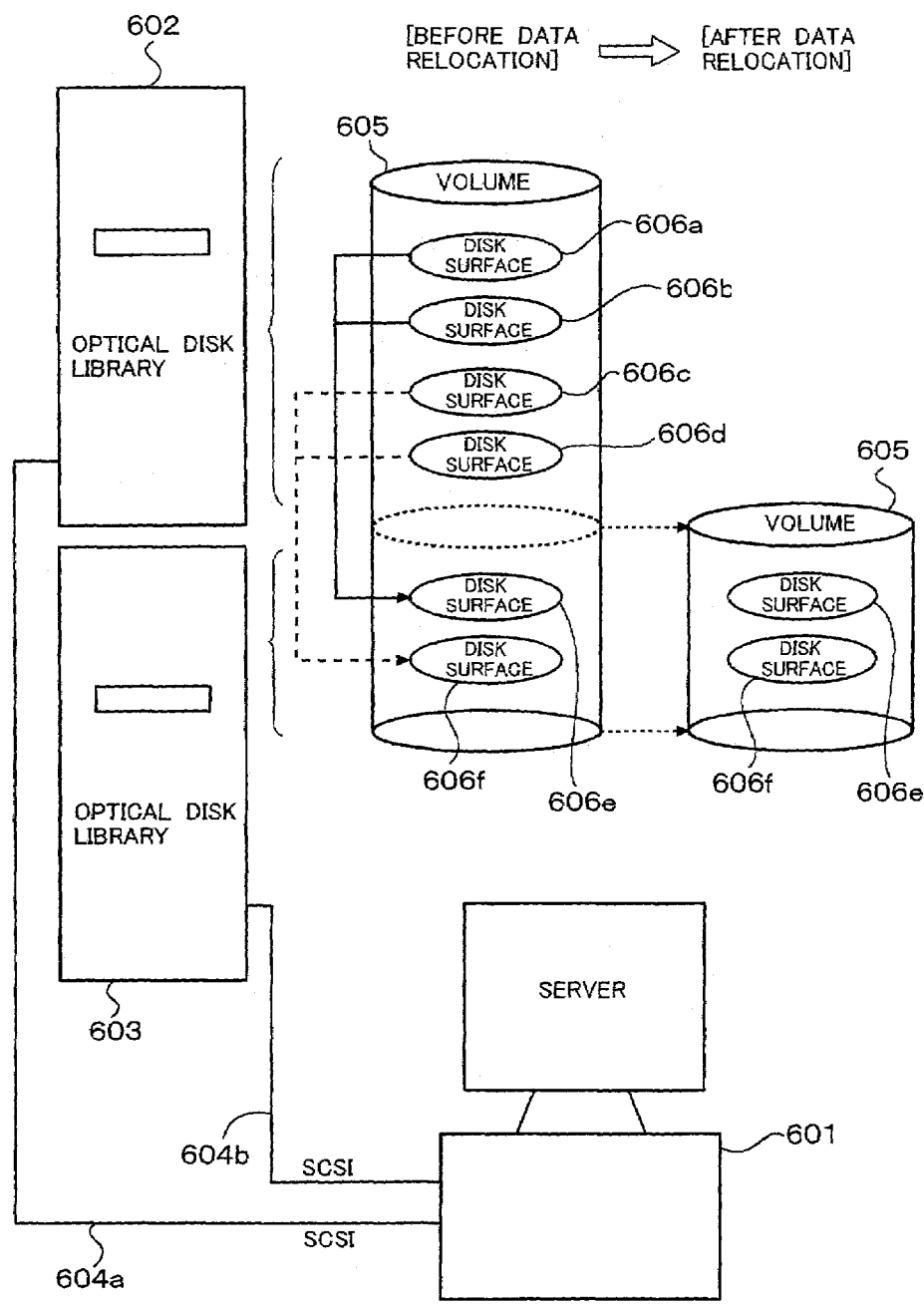
FIG. 8 is a diagram showing an example in which data migration is carried out by the processing for data relocation.

Next, description will be made with reference to FIG. 8 about an example to which such processing for data relocation is applied to migrate data between optical disk libraries. An old optical disk library 602 is connected to a server 601 through an SCSI cable 604a. A new optical disk library 603 is connected likewise to the server 601 through an SCSI cable 604b. In FIG. 8, a disk array for cache is omitted. Here, disk surfaces 606e and 606f of the new optical disk library 603 are added to a volume 605 constituted by disk surfaces 606a, 606b, 606c and 606d of the old optical disk library 602. Therefore, the processing for data relocation is carried out, and the disk surfaces 606a, 606b, 606c and 606d of the old optical disk library 602 are released from management of the volume 605 sequentially as soon as they turn invalid respectively. As a result, the volume 605 is constituted only by the disk surfaces of the new optical disk library 603. Thus, data has been migrated from the old media to the new media.

Next, description will be made about processing for relocating data only in disk surfaces each having a low valid rate of data (large capacity of invalid areas) to thereby restructure a volume (reorganize a volume) according to the invention. Here, the data valid rate of a disk surface (generally a recording medium) is defined as:

data valid rate (%)=valid data capacity/used capacity of disk surface×100

That is, the more the invalid area is in the used area of the disk surface, the lower the data valid rate is. On update/deletion of a file, the control software 11 recalculates the data valid rate of a corresponding disk surface, and sets a value in the file management information database 12 as shown in a table 212 of FIG. 4.

Figure 9:
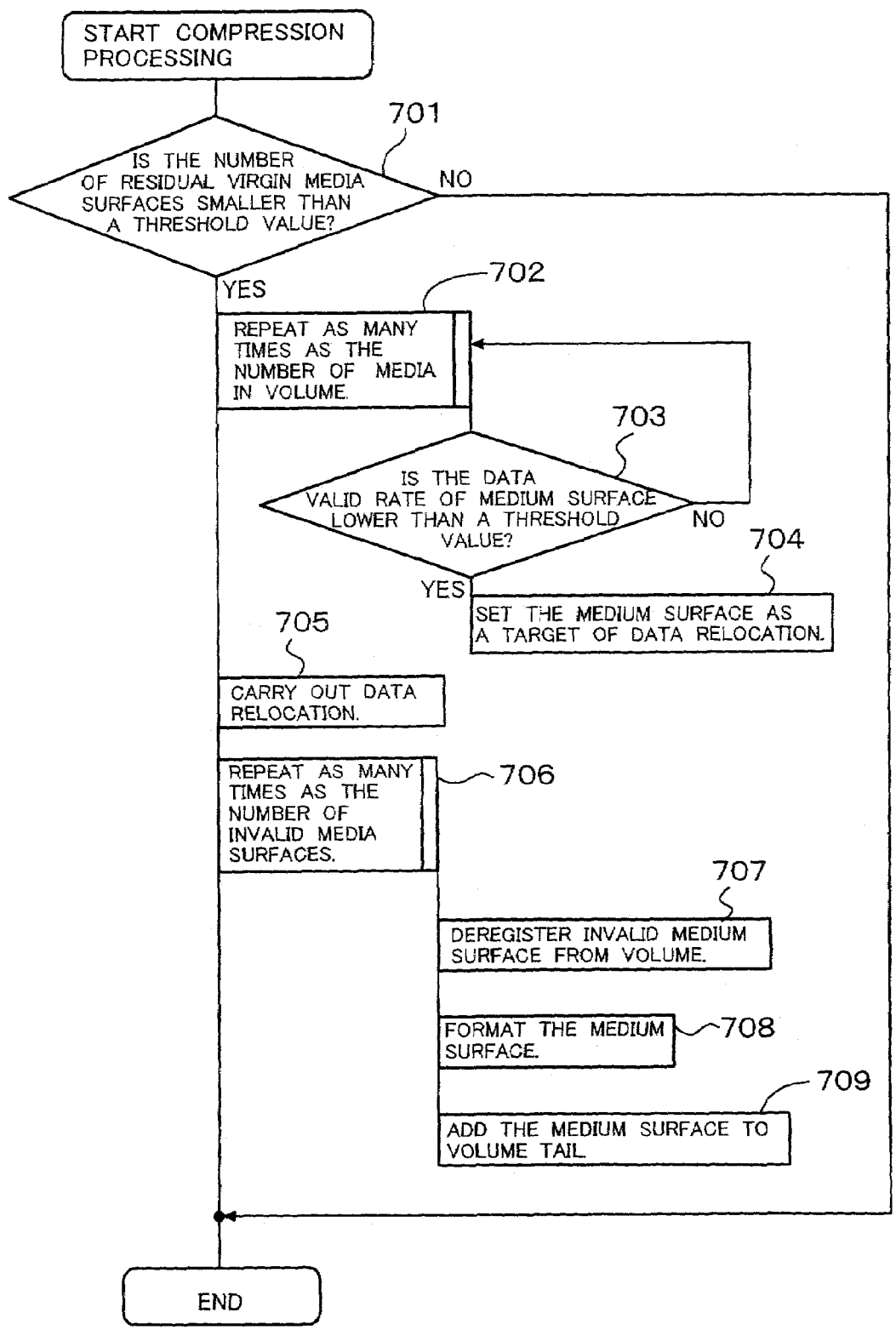
FIG. 9 is a diagram showing a flow chart showing an example of processing for volume reorganization according to the invention.

FIG. 9 shows an example of a flow chart of the processing for volume reorganization according to the invention. The processing for volume reorganization is started up periodically from thread or the like by the control software 11.

First, by a decision 701, the number of blank disk surfaces (virgin media) residual in the target volume is checked based on the file management information. Checking of the number of blank disk surfaces is performed in comparison with an established threshold value. Here, when there are abundant blank disk surfaces, subsequent processing is not carried out. Incidentally, the threshold value is established in the system in advance by an operator who inputs a desired value from an input unit (not shown) such as a keyboard or a mouse. Alternatively, a program may analyze information of operating results of the system or the like, and automatically set an optimum threshold value calculated by the program itself.

On the contrary, if the number of blank (virgin) disk surfaces is smaller than the threshold value, by a decision 703, the data valid rate of each disk surface in the target volume is checked on the basis of the file management information. In order to avoid data relocation in disk surfaces each having a high data valid rate with little invalid area, only disk surfaces each having a data valid rate smaller than the threshold value are set as targets of the processing for data relocation (Step 704). In addition, this processing is repeated as many times as the number of disk surfaces existing in the target volume (Step 702). Next, data relocation is performed on the disk surfaces set as targets (Step 705). Data relocation is carried out by adding data next to a last used area of a disk surface which is being written currently in the target volume, as described above. After the data relocation, deregistration from the volume (Step 707), formatting (Step 708) and re-registration into the volume (Step 709) are carried out on disk surfaces occupied only by invalid areas. This processing is repeated as many times as the number of disk surfaces occupied only by invalid areas (Step 705).

Figure 10:
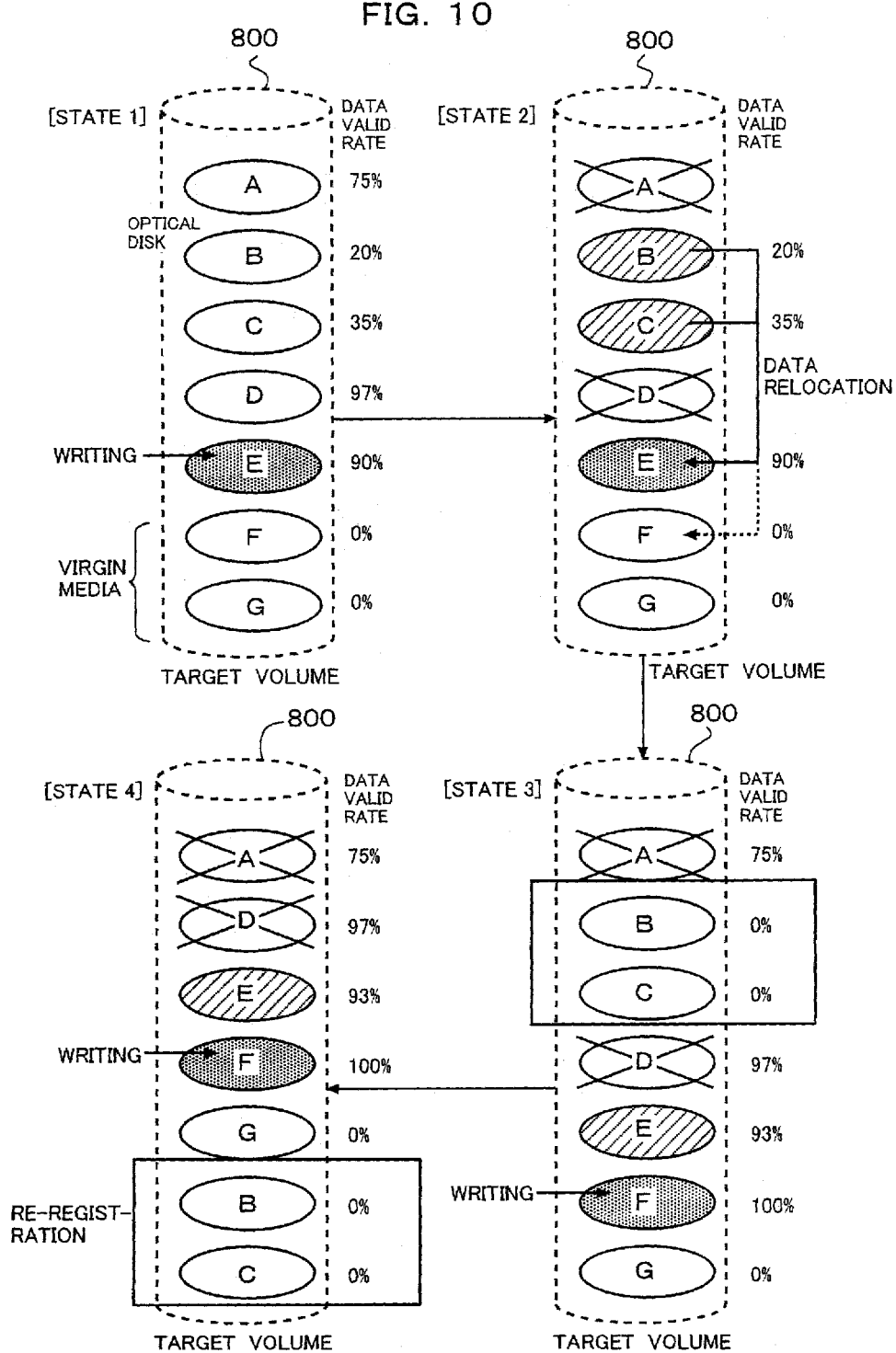
FIG. 10 is a diagram showing a specific example of the processing for volume reorganization according to the invention.

Next, description will be made about a specific example of the processing for volume reorganization. First, assume that an optical disk volume 800 is constituted by seven optical disks (surfaces) A to G as shown in State 1 of FIG. 10. These optical disks are operated on with an additional writing format. Thus, original data becomes invalid data after update/deletion. Generally, the data valid rate is not 100%. In State 1 of FIG. 10, assume that the data valid rates of the disk surfaces A to G are 70%, 20%, 35%, 97%, 0% and 0% by way of example. In addition, assume that writing has been finished up to the tails of the disk surfaces A to D, and the disk surface E is set as a target disk surface to which the volume 800 should be written. Therefore, the disk surfaces F and G have been virgin and have no data written therein.

Consider that the processing for volume reorganization is carried out on the optical disk volume 800 in such State 1. First, on the assumption that the threshold value of the number of residual virgin disk surfaces is 3, the volume 800 is set as a target of processing for reorganization, and the processing for volume reorganization is started (Step 701). Next, on the assumption that the threshold value of the data valid rate of each disk surface is set to be 70%, the disk surfaces A and D each having a data valid rate of 70% or higher are off the target of the processing for data relocation as shown in State 2 (designated by the symbol ×), but only the disk surfaces B and C are made the targets for the processing (Steps 702 to 704). Data relocation is carried out on these disk surfaces B and C (Step 705). When the data relocation has been finished, the target volume 800 comes into State 3. In State 3, the disk surfaces B and C are occupied only by invalid areas (data valid rate of 0%), and every valid data on the disk surfaces B and C has been moved onto the disk surface E or F. Here, the disk surface E has a data valid rate of 93% by way of example, which means the valid data rate of the disk surface E is large than its original 90% because valid data has been increased. The disk surface F has only valid data from the disk surfaces B and C in State 3, and the data valid rate thereof is 100% logically. Next, the disk surfaces B and C occupied only by invalid areas are deregistered from the volume 800, formatted, and re-registered into the volume 800 (Steps 707 to 709). As a result, the volume 800 comes into State 4, of which the invalid areas have been closed up, and free capacity corresponding to the two disk surfaces B and C has been added to the tail.

Figure 11:
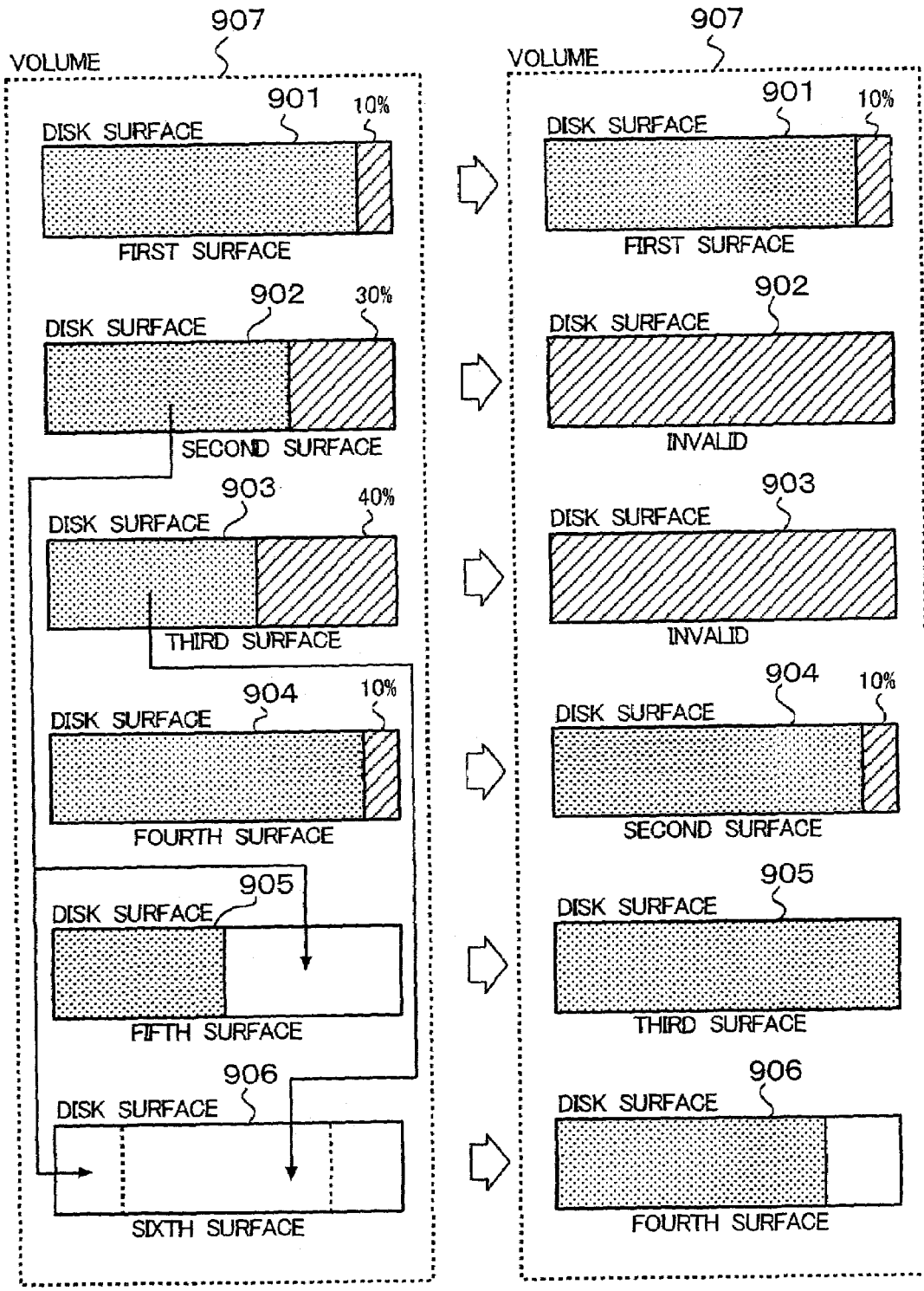
FIG. 11 is a diagram showing an example in which only disk surfaces having plenty of invalid areas are selectively processed by the processing for data relocation according to the invention.

Next, with reference to FIG. 11, description will be made about the case where only disk surfaces each having a large invalid area capacity are subjected to data relocation to bring reduction in the volume size. Before data relocation, assume that a volume 907 is constituted by a disk surface 901 with an invalid area of 10%, a disk surface 902 with an invalid area of 30%, a disk surface 903 with an invalid area of 40%, a disk surface 904 with an invalid area of 10%, a disk surface 905 with a valid area of 50% and a free area of 50%, and a disk surface 906 with a free area of 100%, as shown on the left of FIG. 11. Here, setting is done so that data relocation is carried out only on disk surfaces each having an invalid area of 20% or higher. If the processing for relocation is performed in this setting, the disk surfaces 901 and 904 are off the target of the processing, and only the valid data on the disk surfaces 902 and 903 is added to the disk surfaces 905 and 906. As a result, after the data relocation, the volume 907 has a structure of the disk surfaces 901, 904, 905 and 906 as shown on the right of FIG. 11. The disk surfaces 902 and 903 turning invalid can be formatted to be reused. Incidentally, this embodiment is different from the embodiment previously described with reference to FIG. 10 only in the method for reorganization. Thus, its description will be omitted.

The embodiments of the invention have been described above, but, not to say, the invention is not limited to the embodiments. For example, the invention is not limited to optical disk libraries, and it is generally applicable broadly to storage media libraries in which a plurality of storage media (either single-sided type or double-sided type) are integrated into one logical volume, and data is written with an additional writing format. In addition, although hierarchical storage has been formed by a disk array and an optical disk library in the embodiments, the invention does not have to be limited to such hierarchical storage.

As described above, according to the invention, in an additional writing format optical disk volume, media on which data relocation will be effective are extracted automatically, and the volume is reorganized so that the media can be padded with invalid areas. Thus, in a system using an optical disk library unit or any other storage media library unit having data written on an additional writing format, a load on a system manager can be reduced, and further the capacity of optical disks can be used effectively without waste. As a result, it is possible to improve the cost performance of data relative to bit cost, and the data access performance owing to data put together into media.

In addition, according to the invention, a medium turning invalid due to data relocation is released from a volume, and reformatted. Thus, the medium can be reused so that the available area increases in the storage media library as a whole.

In view of operation, it is not necessary to pad media from a head of a volume sequentially with valid data so that the processing for data relocation can be interrupted at any time in the middle of the processing. Thus, for example, there is an effect that the processing for relocation can be carried out little by little everyday.

In view of data migration between libraries, data migration from old media to new media can be carried out during the processing for data relocation. Thus, it is possible to migrate data even if a new drive cannot read the old media.

When media were created, it was necessary in a related-art method to make a copy of an entire volume after data relocation. According to the invention, it will go well if disks on which data was written due to data relocation are copied. Thus, even if data relocation is carried out, the time to create the sub-media is shortened.

What is claimed is:

1. A method for reorganizing an additional writing format storage media volume in which a plurality of media surfaces are integrated into one logical volume, and data is written into said logical volume on an additional writing format, said method comprising the steps of:

judging whether a number of residual blank media surfaces in said logical volume is smaller than a threshold value;

extracting, from said logical volume, media surfaces each having a data valid rate lower than a threshold value if said number of residual blank media surfaces is smaller than said threshold value;

adding valid data on said extracted media surfaces sequentially to a medium surface which is currently set as a writing target, to thereby carry out data relocation; and deregistering media surfaces occupied only by invalid areas from said logical volume.

2. A method for reorganizing an additional writing format storage media volume according to claim 1, further comprising the steps of:

formatting said media surfaces deregistered from said logical volume; and re-registering said formatted media surfaces into said logical volume.

3. A method for reorganizing an additional writing format storage media volume according to claim 1 or 2, wherein:

said additional writing format storage media volume is an optical disk volume.

4. A method for reorganizing an additional writing format storage media volume according to any one of claims 1 or 2, wherein:

said threshold value for judging said number of residual blank media surfaces in said logical volume and said threshold value for extracting media surfaces each having a low data valid rate are inputted and set desirably from an input unit.

5. A method for reorganizing an additional writing format storage media volume in which a plurality of media surfaces are integrated into one logical volume, and data is written into said logical volume on an additional writing format, said method comprising the steps of:

reading only valid data of each medium surface sequentially from a head medium in said logical volume; and adding said read data to a medium surface where last valid data in said logical volume is written, so as to follow an area of said last valid data wherein:

when data relocation is interrupted, a medium surface address of a medium then set as a target is retained; and when said data relocation is resumed, data is added to follow said medium surface address.

6. A method for reorganizing an additional writing format storage media volume in which a plurality of media surfaces are integrated into one logical volume, and data is written into said logical volume on an additional writing format, said method comprising the steps of:

reading only valid data of each medium surface sequentially from a head medium in said logical volume; and adding said read data to a medium surface where last valid data in said logical volume is written, so as to follow an area of said last valid data wherein:

when data relocation is interrupted, a medium surface address of a medium then set as a target is retained so that data writing is resumed from said medium surface address.

7. A method for reorganizing an additional writing format storage media volume in which a plurality of media surfaces are integrated into one logical volume, and data is written into said logical volume on an additional writing format, said method comprising the steps of:

reading only valid data of each medium surface sequentially from a head medium in said logical volume; and
adding said read data to a medium surface where last valid data in said logical volume is written, so as to follow an area of said last valid data wherein:
when data writing is completed, a medium surface address of a medium then set as a target is retained so that data relocation is resumed from said medium surface address.

8. A method for reorganizing an additional writing format storage media volume according to claim 5, wherein
one volume is constituted by groups of media in libraries belonging to different classes; and
valid data on media in one of said libraries is copied to media in another library sequentially by data relocation so that media to manage in one of said libraries are finally removed.

9. A method for reorganizing an additional writing format storage media volume according to claim 6, wherein
one volume is constituted by groups of media in libraries belonging to different classes; and
valid data on media in one of said libraries is copied to media in another library sequentially by data relocation so that media to manage in one of said libraries are finally removed.

10. A method for reorganizing an additional writing format storage media volume according to claim 7, wherein
one volume is constituted by groups of media in libraries belonging to different classes; and
valid data on media in one of said libraries is copied to media in another library sequentially by data relocation so that media to manage in one of said libraries are finally removed.

11. A method for reorganizing an additional writing format storage media volume according to claim 5, wherein:
only a group of media in which valid areas are smaller than a threshold value is selected from said logical volume;
data relocation is carried out on said group of media; and
said group of media is released from volume management.

12. A method for reorganizing an additional writing format storage media volume according to claim 6, wherein:
only a group of media in which valid areas are smaller than a threshold value is selected from said logical volume;
data relocation is carried out on said group of media; and
said group of media is released from volume management.

13. A method for reorganizing an additional writing format storage media volume according to claim 7, wherein:
only a group of media in which valid areas are smaller than a threshold value is selected from said logical volume;
data relocation is carried out on said group of media; and
said group of media is released from volume management.

14. A method for reorganizing an additional writing format storage media volume according to claim 5, wherein:
said storage media volume comprises optical disks.

15. A method for reorganizing an additional writing format storage media volume according to claim 6, wherein:
said storage media volume comprises optical disks.

16. A method for reorganizing an additional writing format storage media volume according to claim 7, wherein:
said storage media volume comprises optical disks.

17. A method for reorganizing an additional writing format storage media volume according to claim 8, wherein:
said storage media volume comprises optical disks.

18. A method for reorganizing an additional writing format storage media volume according to claim 9, wherein:
said storage media volume comprises optical disks.

19. A method for reorganizing an additional writing format storage media volume according to claim 10, wherein:
said storage media volume comprises optical disks.

20. A method for reorganizing an additional writing format storage media volume according to claim 11, wherein:
said storage media volume comprises optical disks.

21. A method for reorganizing an additional writing format storage media volume according to claim 12, wherein:
said storage media volume comprises optical disks.

22. A method for reorganizing an additional writing format storage media volume according to claim 13, wherein:
said storage media volume comprises optical disks.

* * * * *